(12) United States Patent
Zhang et al.

(10) Patent No.: US 12,537,969 B2
(45) Date of Patent: Jan. 27, 2026

(54) DATA PROCESSING METHOD AND APPARATUS, AND ELECTRONIC DEVICE

(71) Applicant: Huawei Technologies Co., Ltd., Shenzhen (CN)

(72) Inventors: Ziyang Zhang, Beijing (CN); Yaozhun Huang, Shenzhen (CN); Xuxu Li, Shenzhen (CN); Lindong Wu, Shenzhen (CN); Weihua He, Beijing (CN); Kun Tian, Beijing (CN); Jianxing Liao, Shenzhen (CN); Ying Wang, Shenzhen (CN); Yaoyuan Wang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 42 days.

(21) Appl. No.: 18/397,498

(22) Filed: Dec. 27, 2023

(65) Prior Publication Data

US 2024/0137547 A1  Apr. 25, 2024

Related U.S. Application Data

(63) Continuation of application No. PCT/CN2022/100079, filed on Jun. 21, 2022.

(30) Foreign Application Priority Data

Jun. 29, 2021 (CN) .......................... 202110729741.3

(51) Int. Cl.
*H04N 19/46* (2014.01)
*H04N 19/85* (2014.01)
*H04N 25/47* (2023.01)

(52) U.S. Cl.
CPC ............ *H04N 19/46* (2014.11); *H04N 19/85* (2014.11); *H04N 25/47* (2023.01)

(58) Field of Classification Search
None
See application file for complete search history.

(56) References Cited

U.S. PATENT DOCUMENTS

| | | | | |
|---|---|---|---|---|
| 2001/0048680 | A1* | 12/2001 | Yoshimura ............ | H04L 69/167 370/477 |
| 2009/0290641 | A1* | 11/2009 | Crinon ................... | H04N 19/56 375/E7.125 |
| 2021/0243101 | A1* | 8/2021 | Kim ...................... | H04L 43/106 |

FOREIGN PATENT DOCUMENTS

| | | | | |
|---|---|---|---|---|
| CN | 114615508 | A * | 6/2022 | |
| WO | WO-2022125128 | A1 * | 6/2022 | ............... G06T 1/20 |

OTHER PUBLICATIONS

J. Wu, C. Ma, X. Yu and G. Shi, "Denoising of Event-Based Sensors with Spatial-Temporal Correlation," ICASSP 2020—2020 IEEE International Conference on Acoustics, Speech and Signal Processing (ICASSP), Barcelona, Spain, 2020, pp. 4437-4441, doi: 10.1109/ICASSP40776.2020.9053002. (Year: 2020).*

(Continued)

*Primary Examiner* — Stefan Gadomski
(74) *Attorney, Agent, or Firm* — Conley Rose, P.C.

(57) ABSTRACT

A data processing method includes receiving an event data stream, where the event data stream includes at least a first event data item and a second event data item, the first event data item includes a first timestamp for obtaining the first event data item, the second event data item includes a second timestamp for obtaining the second event data item, and the second event data item is obtained most recently before obtaining the first event data item; and obtaining a compressed event data stream corresponding to the event data stream, where the compressed event data stream includes at least a first compressed event data item corresponding to the first event data item, and the first compressed event data item includes first time information.

20 Claims, 7 Drawing Sheets

(56) References Cited

OTHER PUBLICATIONS

Xuemei Xie et al. 2017. An Improved Approach for Visualizing Dynamic Vision Sensor and its Video Denoising. In Proceedings of the International Conference on Video and Image Processing (ICVIP '17). Association for Computing Machinery, New York, NY, USA, 176-180. (Year: 2017).*

Guillermo Gallego et al. "Event-based Vision: A Survey," IEEE Transactions on Pattern Analysis and Machine Intelligence vol. 44 pp. 154-180 (Year: 2020).*

Nabeel Khan et al, "Lossless Compression of Data From Static and Mobile Dynamic Vision Sensors-Performance and Trade-Offs", IEEE Access, IEEE, USA, vol. 8, May 22, 2020 (May 22, 2020), XP011792194, DOI: 10.1109/ACCESS.2020.2996661, total 15 pages.

Anonymous: "delta-of-delta", PyPI, Sep. 2, 2019 (Sep. 2, 2019), URL:https://pypi.org/project/delta-of-delta/>, XP093198778, total 4 pages.

\* cited by examiner

DATA PROCESSING METHOD AND APPARATUS, AND ELECTRONIC DEVICE

CROSS-REFERENCE TO RELATED APPLICATIONS

This is a continuation of International Patent Application No. PCT/CN2022/100079 filed on Jun. 21, 2022, which claims priority to Chinese Patent Application No. 202110729741.3 filed on Jun. 29, 2021. The disclosures of the aforementioned applications are hereby incorporated by reference in their entireties.

TECHNICAL FIELD

Embodiments of this disclosure mainly relate to the field of machine vision technologies, and more specifically, to a data processing method and apparatus, and an electronic device.

BACKGROUND

An event camera (EC), also referred to as an event-based camera, can capture a dynamic change in a scene in an event-driven manner. When an object in a real scene changes, the event camera produces pixel-level output. However, storage space required by an event data stream output by the event camera is large. As a result, a requirement for the storage space is high, and a processing speed is further affected.

SUMMARY

Embodiments of this disclosure provide a solution for processing an event data stream obtained by an event camera.

According to a first aspect, a data processing method is provided. The method includes receiving an event data stream, where the event data stream includes at least a first event data item and a second event data item, the first event data item includes a first timestamp for obtaining the first event data item, the second event data item includes a second timestamp for obtaining the second event data item, and the second event data item is an event data item obtained most recently before obtaining the first event data item; and obtaining a compressed event data stream corresponding to the event data stream, where the compressed event data stream includes at least a first compressed event data item corresponding to the first event data item, the first compressed event data item includes first time information, and the first time information is a time difference between the first timestamp and the second timestamp.

In this way, a timestamp is compressed. Compared with a complete timestamp, a compressed time difference has a lower requirement for storage space, so that storage space can be reduced, and subsequent processing for the compressed data stream has higher efficiency and faster speed.

In some embodiments of the first aspect, the first compressed event data item further includes flag information, and the flag information indicates a range of a quantity of bits occupied by the first time information.

In this way, a quantity of bits occupied by time information is indicated by using flag information, this facilitates subsequent processing for the time information, and the time information may be determined by reading a corresponding quantity of bits based on the flag information, thereby improving a processing speed.

In some embodiments of the first aspect, the event data stream further includes a third event data item, the compressed event data stream further includes a third compressed event data item corresponding to the third event data item, the third compressed event data item includes third time information, and the third time information is a third timestamp for obtaining the third event data item.

In this way, time information of some compressed event data items in the compressed event data stream is the timestamp. This can be used as a time reference of a compressed event data item whose time information is a time difference, thereby ensuring integrity of the time information.

In some embodiments of the first aspect, the compressed event data stream further includes a fourth compressed event data item after the third compressed event data item, fourth time information of the fourth compressed event data item is a fourth timestamp for obtaining a corresponding fourth event data item, and a time difference between the fourth timestamp and the third timestamp exceeds an update threshold.

In this way, time information is set as a frequency and an interval of a timestamp based on the update threshold, so that computational complexity of decompression or other subsequent processing can be avoided while ensuring a compression rate.

In some embodiments of the first aspect, the method further includes deleting, from the compressed event data stream, a plurality of consecutive compressed event data items that meet the following conditions. A sum of time information of the plurality of consecutive compressed event data items exceeds a hot spot noise duration parameter, a sum of time information of the plurality of consecutive compressed event data items other than a last compressed event data item is less than the hot spot noise duration parameter, and a quantity of the plurality of consecutive compressed event data items exceeds a hot spot noise quantity threshold.

In this way, hot spot noise in the compressed event data stream can be removed based on parameters such as preset hot spot noise duration and the hot spot noise quantity threshold, thereby ensuring accuracy of subsequent data processing.

In some embodiments of the first aspect, the method further includes deleting a fifth compressed event data item from the compressed event data stream. Fifth time information of the fifth compressed event data item exceeds background noise duration or is less than refractory period noise duration.

In this way, refractory period noise and/or background noise in the compressed event data stream can be removed based on a parameter, for example, preset noise duration, thereby avoiding interference of the refractory period noise and/or background noise, and ensuring accuracy of subsequent data processing.

In some embodiments of the first aspect, the method further includes updating, based on time information of a deleted compressed event data item, time information of at least one compressed event data item after the deleted compressed event data item.

In this way, after some compressed event data items are deleted from the compressed event data stream, the time information of the at least one subsequent event data item can be updated, to ensure accuracy of the time information and avoid an error of the time information caused by noise deletion. In this way, accuracy of data processing can be further determined.

In some embodiments of the first aspect, the first compressed event data item further includes coordinate information and a polarity of a pixel, and the polarity indicates a luminance change of the pixel when the first event data item is obtained.

In some embodiments of the first aspect, the first compressed event data item further includes the coordinate information of the pixel, and the coordinate information is determined based on resolution of an event camera that collects the event data stream and target resolution.

In this way, based on conversion from the resolution of the event camera to the target resolution, the coordinate information of the compressed event data item can meet a requirement of the target resolution, thereby determining convenience of processing the compressed event data stream and compatibility between the compressed event data stream and image data.

In some embodiments of the first aspect, the method further includes performing frame compression processing on a group of compressed event data items in the compressed event data stream within preset duration.

In this way, frame compression processing can be performed on the event data stream, so that subsequent image processing can be performed on an image obtained through frame compression, thereby extending an applicable scenario.

According to a second aspect, a data processing apparatus is provided. The apparatus includes a receiving unit, configured to receive an event data stream, where the event data stream includes at least a first event data item and a second event data item, the first event data item includes a first timestamp for obtaining the first event data item, the second event data item includes a second timestamp for obtaining the second event data item, and the second event data item is an event data item obtained most recently before obtaining the first event data item; and an obtaining unit, configured to obtain a compressed event data stream corresponding to the event data stream, where the compressed event data stream includes at least a first compressed event data item corresponding to the first event data item, the first compressed event data item includes first time information, and the first time information is a time difference between the first timestamp and the second timestamp. The data processing apparatus may include a functional module configured to implement the method in any one of the first aspect or embodiments of the first aspect.

According to a third aspect, an electronic device is provided. The electronic device includes an event camera and a processor. The event camera may collect an event data stream, and the processor may be configured to implement the method in any one of the first aspect or embodiments of the first aspect.

According to a fourth aspect, a computer-readable storage medium is provided. The computer-readable storage medium stores computer-executable instructions, and when the computer-executable instructions are executed by a processor, operations of the method in any one of the first aspect or embodiments of the first aspect are implemented.

According to a fifth aspect, a chip or a chip system is provided. The chip or the chip system includes a processing circuit, and is configured to implement operations of the method in any one of the first aspect or embodiments of the first aspect.

According to a sixth aspect, a computer program or a computer program product is provided. The computer program or the computer program product is tangibly stored on a computer-readable medium and includes computer-executable instructions. When the computer-executable instructions are executed, operations of the method in any one of the first aspect or embodiments of the first aspect are implemented.

BRIEF DESCRIPTION OF DRAWINGS

The foregoing and other features, advantages, and aspects of embodiments of this disclosure become more obvious with reference to accompanying drawings and with reference to the following detailed descriptions. In the accompanying drawings, same or similar reference numerals represent same or similar elements.

DESCRIPTION OF EMBODIMENTS

Figure 1:
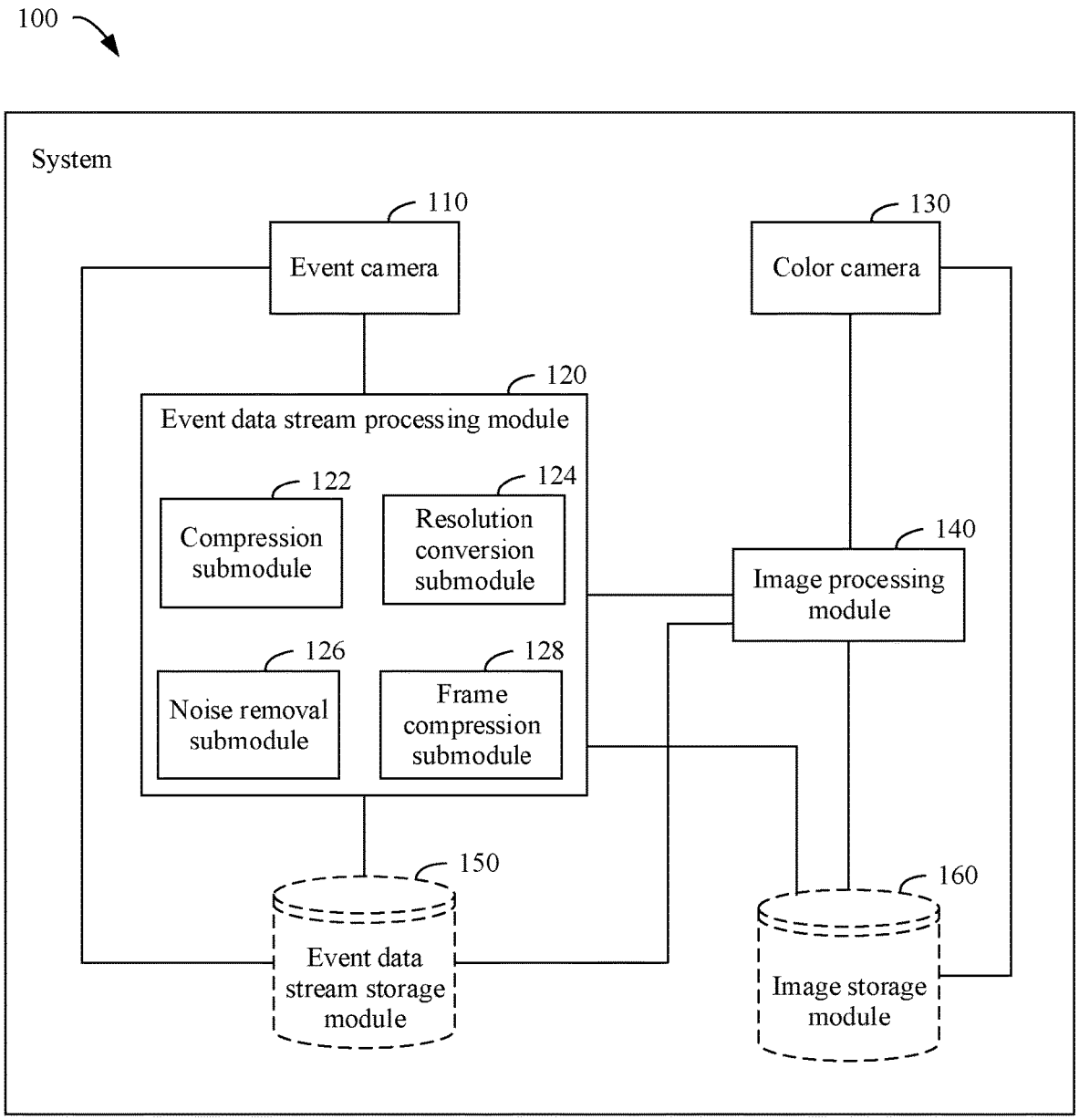
FIG. 1 is a schematic diagram of a structure of a system according to an embodiment of this disclosure.

The following describes embodiments of this disclosure in detail with reference to accompanying drawings. Although some embodiments of this disclosure are shown in the accompanying drawings, it should be understood that this disclosure may be implemented in various forms, and should not be construed as being limited to embodiments described herein. On the contrary, these embodiments are provided so that this disclosure may be thoroughly and completely understood. It should be understood that the accompanying drawings and embodiments of this disclosure are merely used as examples, but are not intended to limit the protection scope of this disclosure.

In descriptions of embodiments of this disclosure, the term "include" and similar terms thereof should be understood as open inclusion, that is, "include but are not limited to". The term "based" should be understood as "at least partially based". The terms "one embodiment" or "the embodiment" should be understood as "at least one embodiment". The terms "first", "second", and the like may indicate different or same objects. Other explicit and implicit definitions may also be included below.

A conventional camera may capture a change of absolute light intensity of each point in a scene, and output a color image or a grayscale image by frame.

An event camera captures a dynamic change in a scene in an event-driven manner, and may also be referred to as an event-based camera, an event sensor, or the like. Generally, the event camera includes a dynamic vision sensor (DVS) or a dynamic and active-pixel vision sensor (DAVIS). The DVS sensor may be considered as a common event camera and outputs an event data stream. An output of the DAVIS sensor includes a grayscale image in addition to an event data stream.

A basic principle of the event camera is as follows. When an accumulated luminance change of a pixel reaches a specific threshold, a corresponding event is output. Specifically, when a large quantity of pixels change due to object motion or an illumination change in a scene, a series of events are generated, and these events are output in an event stream manner. Because the event camera is better at capturing a luminance change, the event camera can also output valid data in dark and strong light scenes. Compared with the conventional camera, the event camera has attracted wide attention due to characteristics of a low delay, a high dynamic range and extremely low power consumption, and has important applications in various fields such as image reconstruction, target tracking and gesture recognition in the high dynamic range.

The event camera can generate and output an event data stream. An event data item in the event data stream generally includes four parts of event information, which is denoted as (t, x, y, p), (x, y) is pixel coordinates of an event in a two-dimensional space, t is a timestamp of the event, p is a polarity of the event, and indicates whether scene luminance increases or decreases. Generally, one event data item represents "at what time, which pixel, luminance increases or decreases". Generally, an increase of an event data item in the event data stream may be referred to as "distribution" of an event.

A timestamp is important event information in an event data item. However, a quantity of bits (generally 64 bits) occupied by the timestamp is large, resulting in a large storage space required by the event data stream. In addition, when further processing is performed on the event data stream, a processing speed may also be reduced because the quantity of bits occupied by the timestamp is excessively large.

In view of this, embodiments of this disclosure provide a solution for processing an event data stream, to compress a timestamp of an event data item collected by an event camera, so that a quantity of bits occupied after compression is smaller. In this way, a requirement for storage space can be reduced, and processing efficiency can be further improved.

Example embodiments of this disclosure are discussed in detail below with reference to the accompanying drawings.

FIG. 1 is a schematic diagram of a structure of a system 100 according to an embodiment of this disclosure. As shown in FIG. 1, the system 100 includes an event camera 110, an event data stream processing module 120, a color camera 130, and an image processing module 140. Optionally, as shown in FIG. 1, the system 100 may further include an event data stream storage module 150 and an image storage module 160. The modules shown in FIG. 1 may communicate with each other.

The color camera 130 may be configured to capture an image or a video. A frame in the image or the video may be a color image or a grayscale image. It may be understood that the "frame" is an image in the video, and for ease of description, "image" and "frame" may be used interchangeably in this specification.

Optionally, the image or the video captured by the color camera 130 may be stored in the image storage module 160. In this embodiment of this disclosure, the image processing module 140 may obtain the image or the video from the color camera 130 or the image storage module 160, to perform subsequent processing.

The event camera 110 may capture an event data stream, and the event data stream may include a plurality of event data items. Each event data item includes event information, denoted as (t, x1, y1, p), t represents a timestamp, and a quantity of occupied bits may be 64 bits, (x1, y1) represents coordinates of a pixel whose range and ratio depend on resolution of the event camera 110. p represents a polarity, and a value of p may be 1 or 0. For example, 1 indicates that luminance increases, and 0 indicates that luminance decreases.

In some examples, for a single pixel, a corresponding event data stream may be obtained. A pixel (x1=21, y1=26) is used as an example. An event data stream obtained for the pixel may be shown in Table 1.

TABLE 1

| t | x1 | y1 | p |
|---|---|---|---|
| 2020 0226 112233 262100 | 21 | 26 | 0 |
| 2020 0226 112233 262101 | 21 | 26 | 1 |
| 2020 0226 112233 262104 | 21 | 26 | 1 |
| ... | ... | ... | ... |
| 2020 0226 112234 262100 | 21 | 26 | 0 |
| 2020 0226 112234 263100 | 21 | 26 | 1 |
| ... | ... | ... | ... |

Optionally, the event data stream captured by the event camera 110 may be stored (for example, cached) in the event data stream storage module 150. Optionally, the event data stream captured by the event camera 110 may be stored in the event data stream storage module 150 after being processed by the event data stream processing module 120.

The event data stream processing module 120 may be configured to process the event data stream. Optionally, as shown in FIG. 1, the event data stream processing module 120 may include a compression submodule 122, a resolution conversion submodule 124, a noise removal submodule 126, and a frame compression submodule 128.

The compression submodule 122 can be configured to compress a timestamp of an event data item in the event data stream, so that a requirement for storage space of a compressed event data item is lower. The following describes functions that can be implemented by the compression submodule 122 with reference to FIG. 2.

Figure 2:
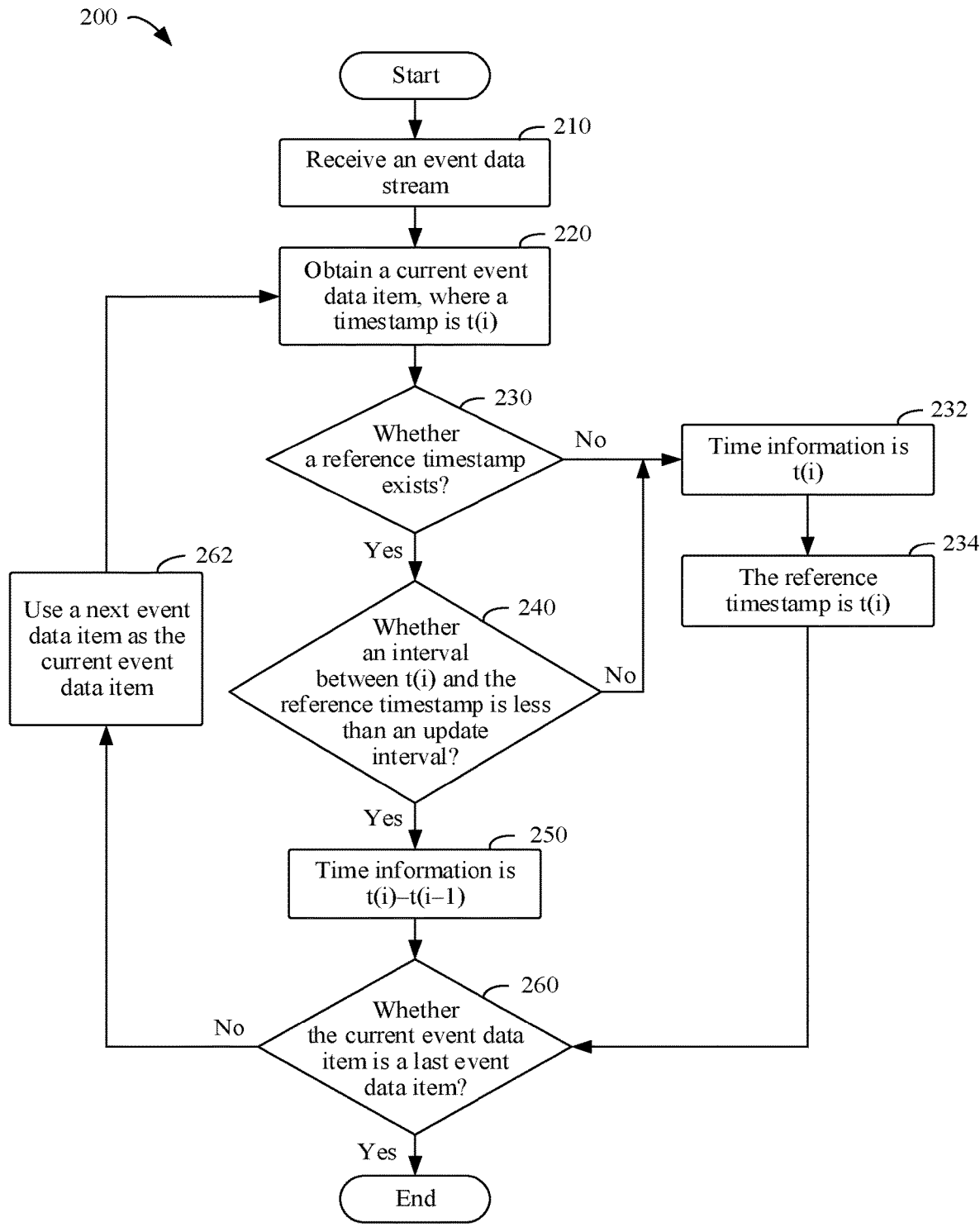
FIG. 2 illustrates an example process in which a compression submodule processes an event data stream to obtain a compressed event data stream according to an embodiment of this disclosure.

FIG. 2 illustrates an example process 200 in which a compression submodule 122 processes an event data stream to obtain a compressed event data stream according to an embodiment of this disclosure.

In 210, the event data stream is received. Specifically, an event data stream collected by an event camera 110 may be received.

For example, an event data stream for a target pixel may be obtained, in other words, coordinate information of pixels in the event data stream is the same, for example, x1=21 and y1=26. The event data stream may be shown in Table 1. In addition, in the event data stream for the target pixel, all the event data items may be sorted according to a time sequence, in other words, sorted according to a collection sequence, so that a timestamp of a previous event data item is earlier than a timestamp of a next event data item in the event data stream. For example, the event data stream obtained in 210 may also be referred to as an original event data stream.

In some embodiments, a compression process for the event data stream may occur in real time, so that the event data stream may be obtained from the event camera 110 in 210, and the obtained event data stream is updated with collection of the event camera 110. In some embodiments, the compression process for the event data stream and a collection process may be performed in different time periods. For example, in 210, an event data stream that is collected and then stored may be obtained from an event data stream storage module 150.

In the process in which the compression submodule 122 compresses the event data stream, all the event data items may be sequentially processed according to the time sequence. For ease of description, an event data item being processed may be referred to as a "current event data item".

In 220, the current event data item is obtained from the event data stream. It may be understood that, when the event data stream starts to be processed, an initial event data item may be first obtained as the current event data item. In an example, the process may also be considered as extracting the current event data item to be processed from event data items. It may be understood that the current event data item includes a timestamp. For example, the timestamp is denoted as t. To facilitate the following descriptions, it may be assumed that the current event data item is an $i^{th}$ event data item in the event data stream, and correspondingly, the timestamp of the current event data item is denoted as t(i).

In 230, it is determined whether a reference timestamp exists.

The reference timestamp may be set and updated in the compression process for the event data stream. The reference timestamp may change or remain the same when different event data items are processed. In an example, the reference timestamp may be denoted as t0. In this embodiment of this disclosure, the reference timestamp may also be referred to as a timestamp header, a timestamp reference, or another name. This is not limited in this disclosure.

If the current event data item is the initial event data item in the event data stream, the set reference timestamp may not exist. In other words, the reference timestamp may be set when the initial event data item in the event data stream is processed.

Specifically, if the current event data item is the initial event data item in the event data stream, there is no reference timestamp in this case. In other words, if a determination result in 230 is no, proceed to 232. Conversely, if the determination result in 230 is yes, in other words, the reference timestamp exists, proceed to 240.

It may be understood that a determining process of 230 may alternatively be implemented as determining whether the current event data item is the initial event data item. If it is determined that the current event data item is the initial event data item, proceed to 232. Conversely, if it is determined that the current event data item is not the initial event data item, proceed to 240.

In 240, it is determined whether an interval between the timestamp t(i) of the current event data item and the reference timestamp is less than an update interval.

In some embodiments, the update interval may be denoted as T1, and 240 may be understood as comparing t(i)−t0 with T1 to determine whether t(i)−t0<T1 is satisfied. In this embodiment of this disclosure, the update interval may be set based on an attribute and an actual requirement (for example, a memory capacity) of the event camera. In an example, it may be assumed that T1=1000000.

For example, if it is determined that t(i)−t0<T1, proceed to 250. Conversely, if it is determined that t(i)−t0≥T1, proceed to 232.

In 232, time information of the current event data item is determined. The time information is the timestamp of the current event data item, that is, t(i). In other words, in 232, the timestamp of the current event data item may be directly used as the time information.

For ease of description, time information of the $i^{th}$ event data item may be denoted as t'(i). In this case, in 232, t'(i)=t(i).

In 234, it is determined that the reference timestamp is the timestamp t(i) of the current event data item.

If the current event data item is the initial event data item in the event data stream, it is determined that no reference timestamp exists in 230, and correspondingly, 234 may be understood as a process of initially setting the reference timestamp.

If the current event data item is not the initial event data item, in other words, it is determined that the reference timestamp exists in 230, and correspondingly, 234 may be understood as a process of updating the reference timestamp.

In this embodiment of this disclosure, the update interval mentioned in 240 may be understood as a period of updating the reference timestamp. In this way, the reference timestamp may be updated based on the update interval, to avoid that time information of an event data item occupies an excessively large quantity of bits. In this way, a requirement for storage space of a compressed event data item can be further reduced.

It may be understood that 234 may be performed simultaneously with 232, or may be performed between 230 and 232 or between 240 and 232, and is not limited to being performed after 232 as shown in FIG. 2.

In 250, the time information of the current event data item is determined, where the time information is a time difference between the timestamp of the current event data item and a timestamp of a previous event data item.

Specifically, the timestamp of the current event data item (the $i^{th}$ event data item) is denoted as t(i), and the previous event data item is an event data item collected by the event camera 110 most recently before collecting the current event data item, that is, an $(i-1)^{th}$ event data item. Correspondingly, the timestamp of the previous event data item of the current event data item is denoted as t(i−1). Therefore, the time information of the current event data item is t'(i)=t(i)−t(i−1).

In this way, for the current event data item, the time information can be determined. The time information is the timestamp determined in 232 or the time difference determined in 250. The time information in this embodiment of this disclosure may indicate the time difference. Specifically, if the time information is the timestamp determined in 232, the time difference indicated by the time information is 0.

In addition, optionally, when the time information is determined in 232 or 250, flag information corresponding to the time information may be further determined. The flag information may indicate a range of a quantity of bits occupied by the time information.

In this embodiment of this disclosure, the flag information may be denoted as f, and a quantity of bits occupied by the flag information may be far less than the quantity (64) of bits occupied by the timestamp. To simplify description, it is assumed that the quantity of bits occupied by the flag information is 2, different ranges may be indicated by using "00", "01", "10", and "11", as shown in Table 2.

TABLE 2

| Flag information f | Quantity of bits occupied by the time information |
|---|---|
| 00 | 64 |
| 01 | [1, k1] |
| 10 | [k1 + 1, k2] |
| 11 | >k2 |

In Table 2, k1 and k2 are positive integers, and 1<k1<k2. Values of k1 and k2 may be set based on an actual scene, the attribute of the event camera, and the like. In an example, k1=4, and k2=8.

In some embodiments, the flag information "00" may indicate that corresponding time information is a timestamp. In this case, it may be considered that a time difference indicated by the flag information "00" is 0.

In some embodiments, a range of the quantity of bits indicated by the flag information "11" may alternatively include an upper limit. For example, the range is [k2+1, k3], where k3 is greater than k2. In an example, k3 may be set based on background noise, for example, k3=10. Optionally, in this embodiment, if the time information determined in 250 is greater than or equal to 1024, that is, a quantity of occupied bits exceeds 12 bits, in this case, it may be considered that the current event data item belongs to noise, and further, the current event data item may be directly deleted.

In some embodiments, the flag information f may indicate an upper limit of a quantity of bits jointly occupied by the time information and the flag information. For example, f=00 indicates that the quantity of bits jointly occupied by the time information and the flag information is 66 bits. For example, f=01 indicates that the quantity of bits occupied by the time information and the flag information is k1+2 bits. For example, f=10 indicates that the quantity of bits occupied by the time information and the flag information is k2+2 bits. For example, f=11 indicates that the quantity of bits occupied by the time information and the flag information is k3+2 bits.

In this way, according to this embodiment of this disclosure, for the current event data item, the corresponding flag information and time information may be determined based on the timestamp.

It may be understood that, because collection of the event camera 110 is based on an event (for example, a luminance change), a quantity of bits occupied by a time difference between two adjacent times of collection is far less than a quantity of bits occupied by a timestamp. In this way, the timestamp of the current event data item can be compressed by using 220 to 250 in FIG. 2.

Further, after the time information of the current event data item is determined, a similar process may be further performed on a subsequent event data item in the event data stream.

In 260, it is determined whether the current event data item is a last event data item in the event data stream.

If yes, the compression process ends. If no, proceed to 262.

In 262, a next event data item in the event data stream is used as the current event data item, and then 220 is performed.

In this way, the compression submodule 122 can compress the event data stream by using the process 200 shown in FIG. 2, and specifically compress a timestamp into time information, or time information and flag information. It may be understood that, in a compressed event data stream, only a small part of time information is a timestamp, and most of the time information is a time difference. Because the time difference occupies a small quantity of bits, the process can implement compression of the timestamp, and the compressed event data stream requires less memory capacity.

In an example, the compressed event data stream obtained by compressing the event data stream in Table 1 is compressed may be shown in Table 3.

TABLE 3

| f | t' | x1 | y1 | p |
|---|---|---|---|---|
| 00 | 2020 0226 112233 262100 | 21 | 26 | 0 |
| 01 | 1 | 21 | 26 | 1 |
| 01 | 3 | 21 | 26 | 1 |
| ... | ... | ... | ... | ... |
| 00 | 2020 0226 112234 262100 | 21 | 26 | 0 |
| 11 | 1000 | 21 | 26 | 1 |
| ... | ... | ... | ... | ... |

As described above with reference to FIG. 2, the compression submodule 122 may compress the event data stream collected by the event camera 110, to convert a timestamp of an event data item into time information (or time information and flag information). In this way, the compressed event data stream is obtained. The compressed event data stream may include a plurality of compressed event data items. The compressed event data item includes time information, and coordinate information and a polarity of a pixel, denoted as (t', x, y, p). Alternatively, optionally, the compressed event data item includes flag information, time information, and coordinate information and a polarity of a pixel, denoted as (f, t', x, y, p).

In this embodiment of this disclosure, a quantity of compressed event data items whose time information is a timestamp is small, for example, the compressed event data items whose time information is a timestamp account for less than 1% of all compressed event data items in the compressed event data stream. An average quantity of bits occupied by the time information and the flag information may be, for example, 4.6 bits. Compared with 64 bits occupied by the timestamp, a compression ratio (64/4.6) in this embodiment of this disclosure is high.

In addition, it may be understood that, in this embodiment of this disclosure, when the timestamp is compressed, a physical meaning of the timestamp is not changed. Specifically, the time information indicates relative time instead of a meaningless encoded character string. Therefore, the compressed event data stream including the time information can be used for subsequent processing without being decompressed. In this way, efficiency of subsequent processing can be improved, and time resources can be reduced.

Still refer to FIG. 1. The resolution conversion submodule 124 can be configured to convert the coordinate information of the pixel. Generally, the event camera 110 usually needs to perform collaborative processing with another sensor or a back-end application. For example, the event data stream collected by the event camera 11 is combined with an image collected by the color camera 130. However, because the resolution of the event camera 110 is different from resolution of the color camera 130, in other words, there is inconsistency between the event camera 110 and the color camera 130 at a resolution level, software and hardware collaborative processing and adaptation to the back-end application may be insufficient.

In this embodiment of this disclosure, the resolution conversion submodule 124 converts coordinates of pixels in the event data stream, so that resolution can be adapted to a required scenario, for example, combined processing with the image.

As described above, the event data item (or the compressed event data item) includes coordinate information of a pixel, which is denoted as (x1, y1). Then, the resolution conversion submodule 124 may convert the coordinate information into (x2, y2), which satisfies the following formula:

$$x_2 = \begin{cases} \left\lfloor \frac{x_1}{\varepsilon_x} + \frac{1}{2} \right\rfloor, & \text{if } \left\lfloor \frac{x_1}{\varepsilon_x} + \frac{1}{2} \right\rfloor < X2 \\ X2, & \text{if } \left\lfloor \frac{x_1}{\varepsilon_x} + \frac{1}{2} \right\rfloor \geq X2 \end{cases}, \quad y_2 = \begin{cases} \left\lfloor \frac{y_1}{\varepsilon_y} + \frac{1}{2} \right\rfloor, & \text{if } \left\lfloor \frac{y_1}{\varepsilon_y} + \frac{1}{2} \right\rfloor < Y2 \\ Y2, & \text{if } \left\lfloor \frac{y_1}{\varepsilon_y} + \frac{1}{2} \right\rfloor \geq Y2 \end{cases}.$$

In the above formula, X1×Y1 represents the resolution of the event camera 110, X1×Y1 represents target resolution to be converted, and $\lfloor \ \rfloor$ represents rounding down. In this way, overflow can be prevented by using a round-down manner, and information loss caused by out-of-bounds can be avoided.

For example, for the compressed data stream shown in Table 3 shown above, it is assumed that the resolution of the event camera 110 is 32×32 and the target resolution is 100×100. Then, x2 and y2 can be obtained through calculation by using the foregoing formulas:

$$x2 = \left\lfloor \frac{x_1}{\varepsilon_x} + \frac{1}{2} \right\rfloor = \left\lfloor \frac{21}{0.32} + \frac{1}{2} \right\rfloor = 66, \ y2 = \left\lfloor \frac{y_1}{\varepsilon_y} + \frac{1}{2} \right\rfloor = \left\lfloor \frac{26}{0.32} + \frac{1}{2} \right\rfloor = 81.$$

Therefore, after being processed by the resolution conversion submodule 124, the compressed event data stream in Table 3 may be shown in Table 4.

TABLE 4

| f | t' | x2 | y2 | p |
|---|---|---|---|---|
| 00 | 2020 0226 112233 262100 | 66 | 81 | 0 |
| 01 | 1 | 66 | 81 | 1 |
| 01 | 3 | 66 | 81 | 1 |
| ... | ... | ... | ... | ... |
| 00 | 2020 0226 112234 262100 | 66 | 81 | 0 |
| 11 | 1000 | 66 | 81 | 1 |
| ... | ... | ... | ... | ... |

In this way, in this embodiment of this disclosure, based on target resolution required by the back-end application, the resolution conversion submodule 124 can implement spatial conversion of coordinate information. A process of such fast arbitrary resolution conversion is simple in calculation, easy to implement, and strong in adaptation.

It should be noted that there is no dependency relationship between the compression submodule 122 and the resolution conversion submodule 124 in this embodiment of this disclosure. Specifically, the event data stream from the event camera 110 may first pass through the compression submodule 122 to obtain the compressed event data stream, and then pass through the resolution conversion submodule 124 to obtain the compressed event data stream with converted coordinates. Alternatively, specifically, the event data stream from the event camera 110 may first pass through the resolution conversion submodule 124 to obtain the event data stream with converted coordinates, and then pass through the compression submodule 122 to obtain the compressed event data stream. For ease of the following descriptions, the compressed event data stream may mean that a compressed event data item in the compressed event data stream includes time information (or time information and flag information), and the compressed event data item further includes coordinate information and a polarity. The coordinate information may be original coordinate information, or may be converted coordinate information. This is not limited in this disclosure.

Still refer to FIG. 1. The noise removal submodule 126 can be configured to determine which data item in the compressed event data stream is a noise data item and delete the noise data item.

Generally, various types of noise exist in the event data stream collected by the event camera 120, for example, hot spot noise, refractory period noise, and background noise. The noise in the event data stream is unfavorable to processing of the back-end application, and may even cause an unreliable result of the subsequent processing.

A reason for generating hot spot noise (Hot pixel noise) may be that a pixel of the event camera is damaged or a charging and discharging apparatus is faulty. As a result, a high-frequency event is generated on a corresponding pixel, and a manifestation is that the corresponding pixel is distributed for excessive times in a specific period of time. The event camera includes various circuit modules such as a differential circuit, a comparison circuit, and a distribution circuit. After event data is generated, a corresponding pixel has a specific refractory period. If the pixel is distributed excessively frequently, it is considered that the pixel is distributed abnormally, and the noise is the refractory period noise. A manifestation is that an interval between two consecutive times of distribution of the corresponding pixel is excessively short. If an event data item in the event data stream is not generated due to an event source, the noise is considered as the background noise. Intensity of the background noise is related to temperature. Higher temperature indicates a greater quantity, but is irrelevant to luminance of a scene. A manifestation is occasional distribution of an event. Therefore, if a pixel is occasionally distributed over a long period of time, it is considered as the background noise.

In this embodiment of this disclosure, the noise removal submodule 126 may process the compressed event data stream output by the compression submodule 122. It should be noted that there is no dependency between the noise removal submodule 126 and the resolution conversion submodule 124. In other words, the noise removal submodule 126 may process the compressed event data stream before the resolution conversion submodule 124, or the noise removal submodule 126 may alternatively process the compressed event data stream with converted coordinates after being processed by the resolution conversion submodule 124. The following describes functions that can be implemented by the noise removal submodule 126 with reference to FIG. 3 to FIG. 5.

Figure 3:
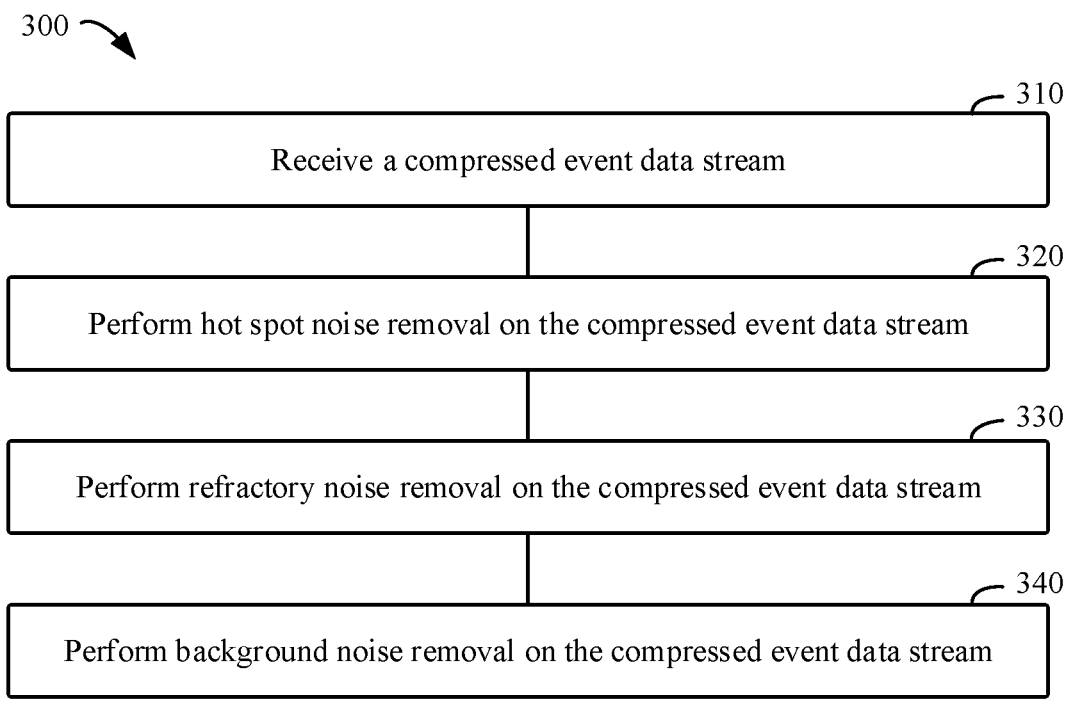
FIG. 3 illustrates an example process in which a noise removal submodule processes a compressed event data stream to obtain a denoised compressed event data stream according to an embodiment of this disclosure.

FIG. 3 illustrates an example process 300 in which a noise removal submodule 126 processes a compressed event data stream to obtain a denoised compressed event data stream according to an embodiment of this disclosure.

In 310, the compressed event data stream is received. Specifically, a compressed event data stream compressed by a compression submodule 122 may be received.

For example, the compressed event data stream includes a plurality of compressed event data items, and the compressed event data item includes time information, coordinate information, and a polarity, for example, (t', x, y, p). Alternatively, the compressed event data item includes flag information, the time information, the coordinate information, and the polarity, for example, (f, t', x, y, p). It may be understood that the coordinate information of the compressed event data item may be (x1, y1) or (x2, y2) processed by a resolution conversion submodule 124. This is not limited in this disclosure.

In 320, hot spot noise removal is performed on the compressed event data stream. In this embodiment of this disclosure, hot spot noise may be removed based on the following parameters: a hot spot noise duration parameter (denoted as T2), a quantity threshold (denoted as Nh), and a sliding window parameter (denoted as n). The hot spot noise duration parameter indicates and determines a duration threshold of the hot spot noise, and the quantity threshold indicates a distribution quantity threshold in the hot spot noise duration parameter. It may be understood that, the hot spot noise is represented as an excessive (greater than the quantity threshold) distribution quantity of times of a corresponding pixel within specific duration (the hot spot noise duration parameter). Therefore, the hot spot noise duration parameter and the quantity threshold are correspondingly set. Specifically, specific values of the hot spot noise duration parameter and the quantity threshold may be set based on a test result of an event camera 110. The sliding window parameter indicates a sliding interval during hot spot noise removal, and the value may be preset based on processing precision, an application scenario, and the like. In an example, it is assumed that T2=1000, Nh=50, and n=1.

Figure 4:
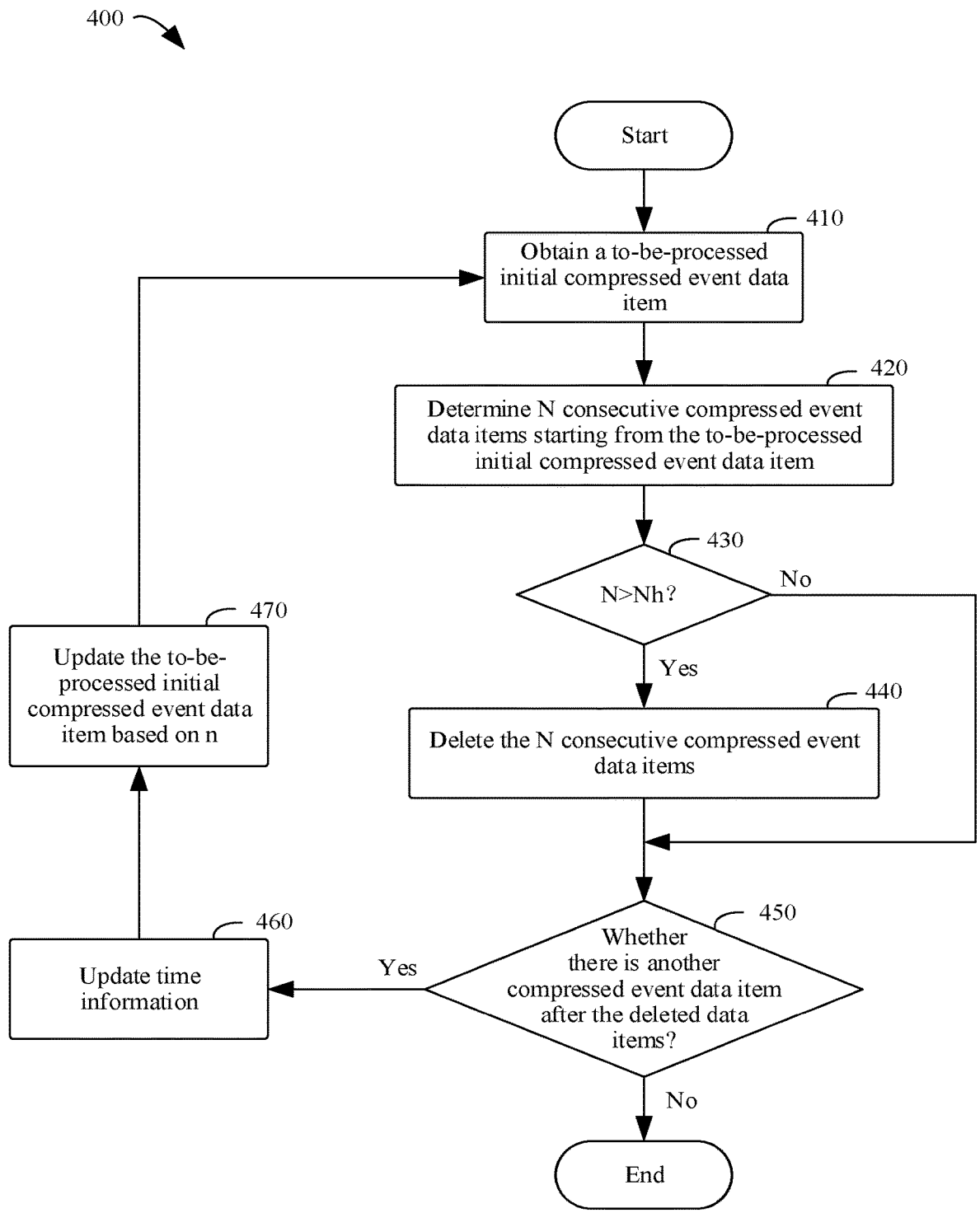
FIG. 4 illustrates an example process in which a noise removal submodule performs hot spot noise removal according to an embodiment of this disclosure.

A hot spot noise removal process may be shown in FIG. 4.

FIG. 4 illustrates an example process 400 in which a noise removal submodule 126 performs hot spot noise removal according to an embodiment of this disclosure.

In 410, a to-be-processed initial compressed event data item is obtained.

It may be understood that, when the process 400 starts to be executed, the to-be-processed initial compressed event data item may be an initial compressed event data item in a compressed event data stream. When the process 400 is executed, the to-be-processed initial compressed event data item may be updated based on a sliding window parameter n, as described below with reference to 470.

In 420, N consecutive compressed event data items starting from the to-be-processed initial compressed event data item are determined, and the N consecutive compressed event data items meet the following conditions. A sum of time differences indicated by time information of the N consecutive compressed event data items exceeds T2, and a sum of time differences indicated by time information of N−1 consecutive compressed event data items in which a last compressed event data item in the N consecutive compressed event data items is deleted does not exceed T2.

For any compressed event data item (assuming a $j^{th}$ compressed event data item) in the compressed event data stream, it may be understood that the $j^{th}$ compressed event data item has time information t'(j), and t'(j)=t(j) or t'(j)=t(j)−t(j−1). When the time information t'(j) is a timestamp, that is, t'(j)=t(j), it may be determined that a time difference indicated by the time information of the $j^{th}$ compressed event data item is 0. When the time information t'(j) is a time difference, that is, t'(j)=t(j)−t(j−1), it may be determined that the time difference indicated by the time information of the $j^{th}$ compressed event data item is t(j)−t(j−1).

In embodiments including flag information, a time difference indicated by time information may be determined based on the flag information. Specifically, as shown in the example in Table 2, if the flag information f=00, a time difference indicated by corresponding time information is 0. If the flag information f is 01, 10, or 11, a time difference indicated by corresponding time information is the time information.

In some embodiments, in 420, starting from the to-be-processed initial compressed event data item, time differences indicated by time information may be sequentially accumulated, and an accumulated sum is continuously compared with T2 until the accumulated sum is greater than T2. In this way, the N consecutive compressed event data items may be determined. It may be understood that N is a minimum value satisfying that an accumulated sum starting from the to-be-processed initial compressed event data item is greater than T2.

In 430, it is determined whether N is greater than Nh.

Specifically, N determined in 420 may be compared with the preset quantity threshold Nh, to determine whether N is greater than Nh. If it is determined that N>Nh, proceed to 440. Conversely, if N≤Nh, proceed to 450.

In 440, the N consecutive compressed event data items are deleted from the compressed event data stream.

Specifically, if it is determined in 430 that N>Nh, it may be determined that the N consecutive compressed event data items belong to hot spot noise, and further the N consecutive compressed event data items are deleted in 440.

In 450, it is determined whether there is another compressed event data item after the N consecutive compressed event data items.

It may be understood that if it is determined that there is no another compressed event data item thereafter, it indicates that a hot spot noise processing for the compressed event data stream may end. Conversely, if there is another compressed event data item thereafter, proceed to 460 to continue processing.

In 460, time information is updated for at least one compressed event data item after the N consecutive compressed event data items.

Specifically, in 460, it may be determined whether at least one compressed event data item that needs to be updated exists in the compressed event data stream, and if yes, time information of the at least one compressed event data item is updated. The process is shown in FIG. 5 below.

Figure 5:
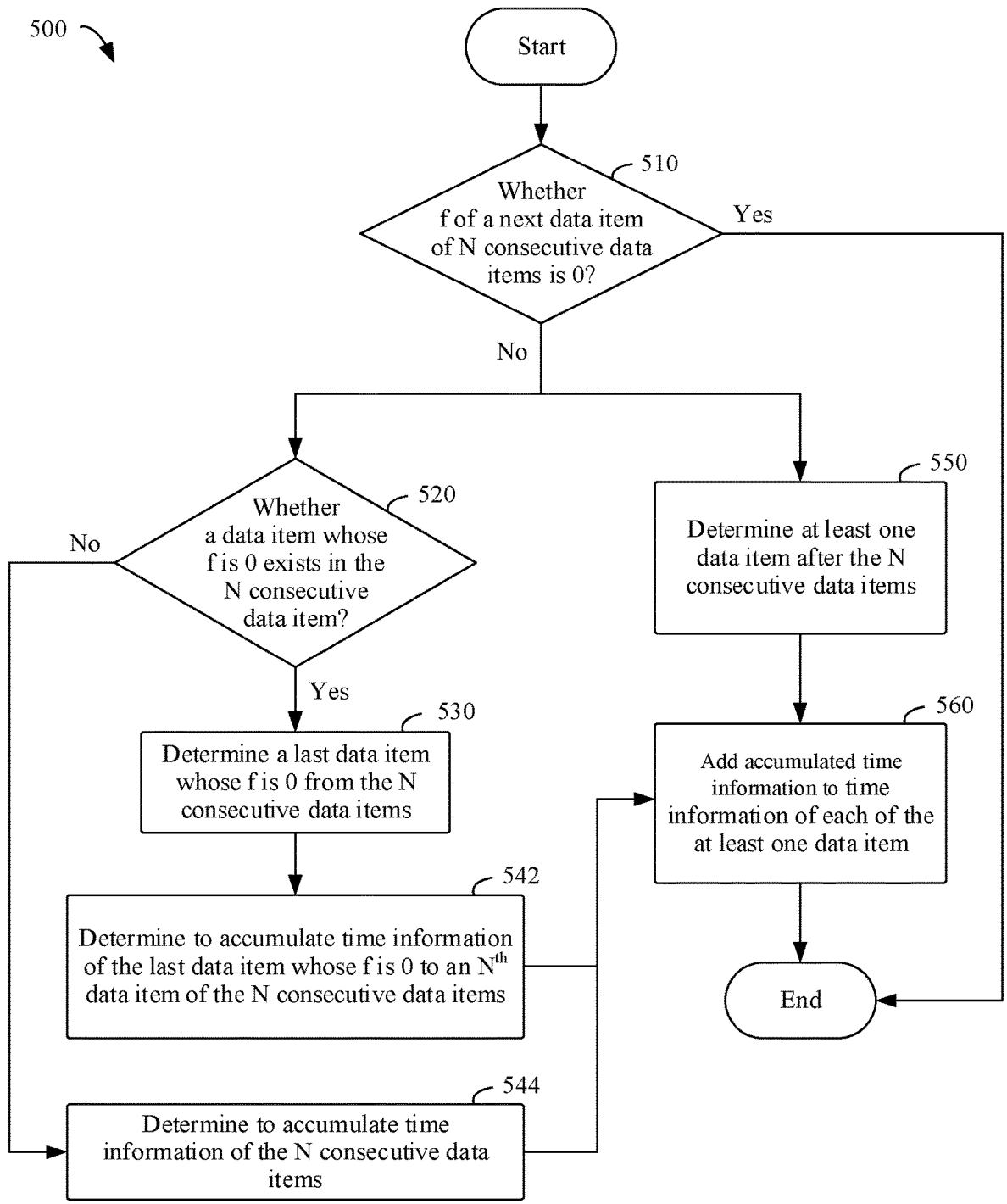
FIG. 5 illustrates a process for updating time information after N consecutive compressed event data items are deleted according to an embodiment of this disclosure.

FIG. 5 illustrates a process 500 for updating time information after N consecutive compressed event data items are deleted, according to an embodiment of this disclosure.

In 510, it is determined whether flag information (f) of a next compressed event data item after the N consecutive compressed event data items in a compressed event data stream is 00.

Specifically, it is assumed that the N consecutive compressed event data items are an $i1^{th}$ compressed event data item to an $(i1+N-1)^{th}$ compressed event data item in the compressed event data stream. Then the next compressed event data item is an $(i1+N)^{th}$ compressed event data item in the compressed event data stream.

It may be understood that 510 is a description based on the foregoing embodiment with reference to flag information. Correspondingly, in another embodiment, 510 may be implemented to determine whether time information of the next compressed event data item is a timestamp.

If it is determined in 510 that f of the next compressed event data item is 00, that is, the time information of the next compressed event data item is the timestamp, the updating process ends, in other words, the time information does not need to be updated. Conversely, if it is determined in 510 that f of the next compressed event data item is not 00, that is, the time information of the next compressed event data item is a time difference, the process 500 proceeds to 520 and 550.

In 520, it is determined whether a compressed event data item whose f is 00 exists in the N consecutive compressed event data items.

In other words, it may be determined in 520 whether there is a compressed event data item whose time information is the timestamp in the N consecutive compressed event data items. If it is determined in 520 that the compressed event data item whose f is 00 does not exist, that is, time information of each of the N consecutive compressed event data items is the time difference, the process 500 proceeds to 544. Conversely, if it is determined in 520 that the compressed event data item whose f is 00 exists, that is, there is a compressed event data item whose time information is the time difference in the N consecutive compressed event data items, the process 500 proceeds to 530.

In 530, a last compressed event data item whose f is 00 is determined from the N consecutive compressed event data items.

If there is only one compressed event data item whose f is 00 in the N consecutive compressed event data items, in other words, time information of only one compressed event data item is the timestamp, and time information of other (N−1) compressed event data items is the time difference, the last compressed event data item whose f is 00 determined in 530 is the only one compressed event data item.

If there is more than one compressed event data item whose f is 00 in the N consecutive compressed event data items, the last compressed event data item whose f is 00 determined in 530 is one of the more than one compressed event data item.

For ease of understanding, it may be assumed that the last compressed event data item whose f is 00 determined in 530 is an $(i2)^{th}$ compressed event data item in the N consecutive compressed event data items. In this case, it may be understood that in the N consecutive compressed event data items, time information of an $(i2+1)^{th}$ compressed event data item to an $N^{th}$ compressed event data item is the time difference instead of the timestamp.

In 542, time information of the last compressed event data item whose f is 00 to an $N^{th}$ compressed event data item in the N consecutive compressed event data items is determined to accumulate.

Specifically, the time information of the last compressed event data item (assuming the $(i2)^{th}$ compressed event data item in the N consecutive compressed event data items) whose f is 00 is the timestamp, and an indicated time difference is 0. In this case, step 542 may be understood as: from a next compressed event data item (an $(i2+1)^{th}$ compressed event data item in the N consecutive compressed event data items) of the last compressed event data item whose f is 00 to the $N^{th}$ compressed event data item in the N consecutive compressed event data items, each piece of time information is the time difference, and the (N−i2) pieces of time information may be summed up to obtain accumulation.

In other words, the time difference indicated by respective time information from the last compressed event data item whose f is 00 to the $N^{th}$ compressed event data item in the N consecutive compressed event data items is determined to accumulate in 542.

In 544, time information of the N consecutive compressed event data items is determined to accumulate.

It may be understood that the determined accumulation in 542 or 544 does not include the compressed event data item whose f is 00. In other words, the determined accumulation is accumulation of time information of consecutive compressed event data items starting from a previous timestamp, whose time information is the time difference, before the next compressed event data item (the $(i1+N)^{th}$ compressed event data item).

In 550, at least one consecutive compressed event data item starting from the next compressed event data item is determined.

Specifically, the at least one compressed event data item is located after and adjacent to the N consecutive compressed event data items, and time information of each of the at least one compressed event data item is the time difference. In addition, time information of a next compressed event data item after the at least one compressed event data item is the timestamp.

In 560, accumulated time information is added to the time information of each of the at least one compressed event data item. The accumulated time information is determined in 542 or 544.

In other words, the accumulated time information is added to the time information of each of the at least one compressed event data item after the N consecutive deleted compressed event data items and before a next timestamp.

In this way, accuracy of time information in the compressed event data stream can be ensured, and a time deviation caused by deletion of some compressed event data items can be avoided.

Still refer to FIG. 4. After the time information is updated in 460, the process 400 proceeds to 470.

In 470, a next to-be-processed initial compressed event data item is determined based on the sliding window parameter, and then 410 is performed.

Specifically, the sliding window parameter is denoted as n. In this case, in 470, n compressed event data items may be moved backward from a previous to-be-processed initial compressed event data item, to determine the next to-be-processed initial compressed event data item.

In this way, a hot spot noise removal process is described in this embodiment of this disclosure with reference to FIG. 4 and FIG. 5. In this way, hot spot noise in the compressed event data stream can be effectively removed, and further, accuracy of subsequent processing for the compressed event data stream can be improved.

Still refer to FIG. 3. In 330, refractory period noise removal is performed on the compressed event data stream.

In this embodiment of this disclosure, refractory period noise duration, denoted as T3, may be set based on a circuit attribute of the event camera 110 and a minimum time interval at which the event camera 110 collects an event. In an example, T3=2.

Specifically, a compressed event data item that meets "a time difference indicated by time information is less than the refractory period noise duration" may be deleted from the compressed event data stream.

For example, with reference to the foregoing Table 4, if time information of a second compressed event data item (01, 1, 66, 81, 1) is 1, which is less than T3, the compressed event data item (01, 1, 66, 81, 1) may be deleted from the compressed event data stream.

In some embodiments, after the refractory period noise event data item is deleted, at least one compressed event data item that meets accumulation conditions and is located after the refractory period noise event data item may be determined, and time information of the refractory period noise event data item is added to time information of each of the at least one compressed event data item. The accumulation conditions may include: the at least one compressed event data item is located after the refractory period noise event data item, time information of each of the at least one compressed event data item is the time interval, and time information of a next compressed event data item after the at least one compressed event data item is the timestamp. For example, for a process of determining the at least one compressed event data item herein, refer to 550 described above with reference to FIG. 5. To avoid repetition, details are not described herein again.

In 340, background noise removal is performed on the compressed event data stream.

In this embodiment of this disclosure, background noise may be represented as occasional distribution in a long time. Correspondingly, the background noise duration may be set accordingly, and the background noise duration is denoted as T4. In an example, T4=999.

Specifically, a compressed event data item that meets "time difference indicated by time information exceeds the refractory period noise duration" may be deleted from the compressed event data stream.

For example, with reference to the foregoing Table 4, time information of a compressed event data item (11, 1000, 66, 81, 1) is 1000, which exceeds T4, and the compressed event data item (11, 1000, 66, 81, 1) may be deleted from the compressed event data stream.

In some embodiments, after the background noise event data item is deleted, at least one compressed event data item that meets accumulation conditions and is located after the background noise event data item may be determined, and time information of the background noise event data item is added to time information of each of the at least one compressed event data item. The accumulation conditions may include: the at least one compressed event data item is located after the background noise event data item, time information of each of the at least one compressed event data item is the time interval, and time information of a next compressed event data item after the at least one compressed event data item is the timestamp. For example, for a process of determining the at least one compressed event data item herein, refer to 550 described above with reference to FIG. 5. To avoid repetition, details are not described herein again.

A process of performing noise removal by the noise removal submodule 126 is described above with reference to FIG. 3 to FIG. 5. However, it should be understood that this description is merely an example, and should not be construed as a limitation on the protection scope of this disclosure. For example, 330 may be performed before 320 or after 340, and 340 may be performed before 330 or even before 340.

In this way, in this embodiment of this disclosure, the noise removal submodule 126 can perform denoising on the compressed event data stream, and does not need to perform a decompression operation. In addition, the denoising solution in this embodiment of this disclosure is simple, occupies small space, has low calculation overheads, and is fast. Moreover, a parameter involved in the denoising is adjustable, and the denoising has strong versatility and better adaptation.

It should be noted that, although a function of the compression submodule 122 is described with reference to FIG. 2 and a function of the noise removal submodule 126 is described with reference to FIG. 3 to FIG. 5, functions of different submodules may be combined with each other in this embodiment of this disclosure. For example, a process of refractory period noise removal and/or background noise removal may be performed by the compression submodule 122. With reference to FIG. 2, it may be determined in 250 whether the compressed event data item belongs to refractory period noise and/or background noise, to achieve refractory period noise removal and/or background noise removal.

The process described above with reference to FIG. 2 to FIG. 5 is processing performed on the event data stream for the target pixel. It may be understood that similar processing may be performed on an event data stream with another pixel collected by the event camera 110, so that compression, resolution conversion, and noise removal can be implemented for event data streams with all pixels collected by the event camera 110.

Still refer to FIG. 1. The frame compression submodule 128 can be configured to perform frame compression processing on the compressed event data stream. Specifically, the frame compression submodule 128 may divide compressed event data items within preset duration into two groups based on polarities, and then convert the compressed event data items into two frames of images. For example, the preset duration may be denoted as T5. In an example, it may be assumed that T5=10000.

In some embodiments, the frame compression submodule 128 may obtain a compressed event data stream processed by the noise removal submodule 126. A plurality of compressed event data items within the preset duration may be determined based on time information of each compressed event data item in the compressed event data stream.

In an example, earliest time information (for example, a timestamp) in each pixel may be calculated, and the earliest time information is set as a start time. For example, the start time may be denoted as Ts. Subsequently, time differences indicated by time information that is after the start time Ts and that corresponds to all the compressed event data items may be accumulated until Ta≥T5, where an accumulated time difference is denoted as Ta. In this way, the plurality of compressed event data items within the preset duration (T5) are obtained.

Subsequently, for the obtained plurality of compressed event data items within the preset duration, a quantity of times that a polarity is enhanced (for example, p=1) and a quantity of times that the polarity is weakened (for example, p=0) on each pixel may be counted. Therefore, the compressed event data item can be converted into an event occurrence intensity signal at coordinates of the corresponding pixel. For example, for a pixel whose coordinates are (x2=2, y2=69), it is determined, through statistics, that there are six compressed event data items whose polarity is enhanced (p=1) and nine compressed event data items whose polarity is weakened (p=0) within the preset duration. Therefore, it may be determined, based on this, that at the coordinates (x2=2, y2=69) of the frame obtained through frame compression, a corresponding position strength corresponding to a frame whose polarity is enhanced is 6, and a corresponding strength corresponding to a position corresponding to a frame whose polarity is weakened is 9. In this manner, strength of polarity enhancement and strength of polarity weakening that correspond to pixels may be successively calculated to form two frames of information. After being visualized, the two frames of information becomes two frames of images, and each coordinate point of the image is a quantity of corresponding events that occur within the preset duration (T5). One frame indicates the quantity of times that the polarity is enhanced, and one frame indicates the quantity of times that the polarity is weakened.

Further, the frame compression submodule 128 may update initial time for frame compression to Ts+Ta, and perform frame compression processing on a compressed event data item after Ts.

In some embodiments, an image processed by the frame compression submodule 128 may be stored in an image storage module 160.

In this way, the frame compression submodule 128 in this embodiment of this disclosure can perform frame compression processing on the compressed event data stream, to obtain an image, and does not need to decompress the compressed event data stream, so that frame compression processing is more efficient, compression speed is fast, and universality is good.

It should be understood that although embodiments of this disclosure are described above with reference to FIG. 1, FIG. 1 should not be construed as a limitation on embodiments of this disclosure. For example, different modules or submodules shown in FIG. 1 may be combined. For example, some modules or submodules shown in FIG. 1 may not be included in the system 100. In an example, the event data stream processing module 120 includes the compression submodule 122, but does not include a resolution conversion submodule 124, the noise removal submodule 126, and the frame compression submodule 128. A compressed event data stream processed by the compression submodule 122 may be stored in an event data stream storage module 150. Optionally, when further processing is required subsequently, a compressed event data stream may be obtained from the event data stream storage module 150, and the compressed event data stream is restored to an event data stream by using a decompression operation. In another example, the event data stream processing module 120 includes the compression submodule 122 and the noise removal submodule 126, but does not include the resolution conversion submodule 124 and the frame compression submodule 128. A compressed event data stream processed by the compression submodule 122 and the noise removal submodule 126 may be stored in the event data stream storage module 150. Optionally, when further processing is required subsequently, the compressed event data stream may be obtained (for example, by an image processing module 140) from the event data stream storage module 150, and an image is obtained by performing a frame compression operation.

It may be understood that the system 100 shown in FIG. 1 may be a software system, a hardware system, or a system combining software and hardware. The system 100 shown in FIG. 1 may be implemented as a computing device or a part of a computing device. The computing device includes but is not limited to a desktop computer, a mobile terminal, a wearable device, a server, a cloud server, and the like. The system 100 shown in FIG. 1 may be implemented as a distributed system. For example, in FIG. 1, some modules of the system 100 are deployed on a first device, and other modules of the system 100 are deployed on a second device.

In this way, according to embodiments of this disclosure, a timestamp in an event data stream can be converted into time information, thereby implementing compression on the event data stream, so that a requirement for storage space of the compressed event data stream is lower, and subsequent processing for the compressed event data stream is more efficient and faster.

Figure 6:
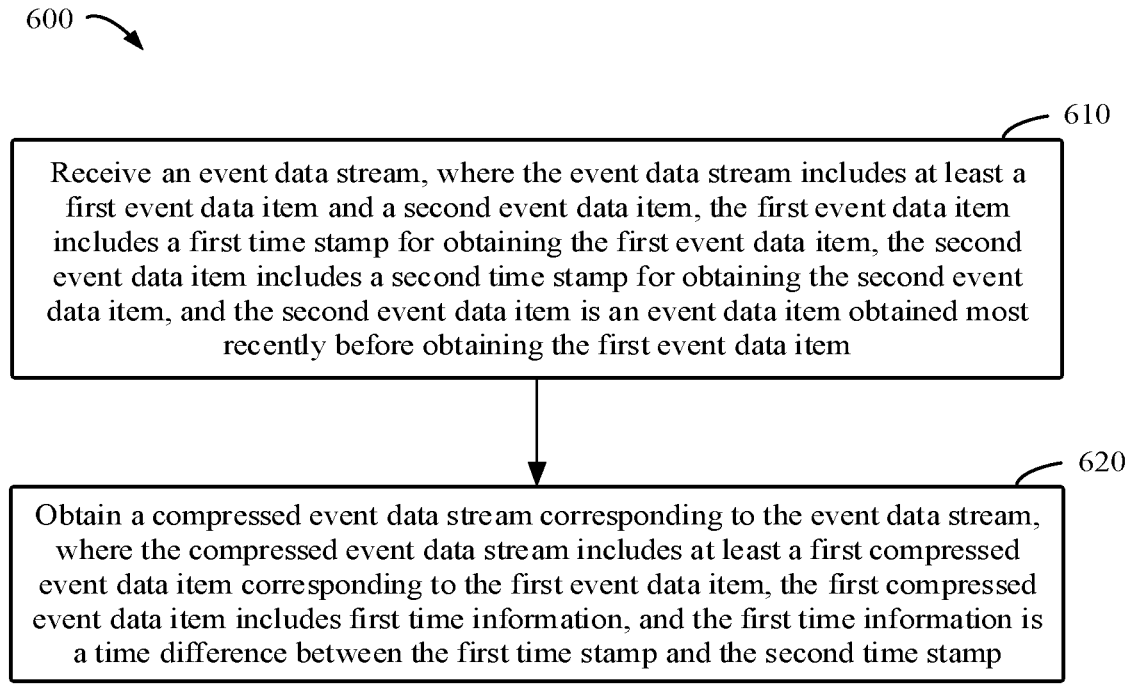
FIG. 6 is an example flowchart of a process of data processing according to an embodiment of this disclosure.

FIG. 6 is an example flowchart of a process 600 of data processing according to an embodiment of this disclosure. The process 600 shown in FIG. 6 may be performed by a system 100, and may be specifically performed by an event data stream processing module 120.

As shown in FIG. 6, at block 610, an event data stream is received, where the event data stream includes at least a first event data item and a second event data item, the first event data item includes a first timestamp for obtaining the first event data item, the second event data item includes a second timestamp for obtaining the second event data item, and the second event data item is an event data item obtained most recently before obtaining the first event data item.

At block 620, a compressed event data stream corresponding to the event data stream is obtained, where the compressed event data stream includes at least a first compressed event data item corresponding to the first event data item, the first compressed event data item includes first time information, and the first time information is a time difference between the first timestamp and the second timestamp.

In some embodiments, the first event data item and reference timestamp may be obtained. If a time interval between the first timestamp of the first event data item and the reference timestamp is less than an update interval, it is determined that the first time information of the first event data item is the time difference between the first timestamp and the second timestamp. Alternatively, optionally, if the time interval between the first timestamp of the first event data item and the reference timestamp is less than the update interval, and the time difference between the first timestamp and the second timestamp is less than background noise duration, it is determined that the first time information of the first event data item is the time difference between the first timestamp and the second timestamp.

In some embodiments, the event data stream further includes a third event data item. Correspondingly, the compressed event data stream further includes a third compressed event data item corresponding to the third event data item. The third compressed event data item includes third time information, and the third time information is a third timestamp for obtaining the third event data item.

In some embodiments, the third event data item and the reference timestamp may be obtained. If a time interval between the third timestamp of the third event data item and the reference timestamp exceeds the update interval, it is determined that the third time information of the third event data item is the third timestamp. Optionally, the reference timestamp may be further updated. Specifically, the reference timestamp is updated to the third timestamp.

In some embodiments, the compressed event data stream further includes a fourth compressed event data item after the third compressed event data item, fourth time information of the fourth compressed event data item is a fourth timestamp for obtaining a corresponding fourth event data item, and a time difference between the fourth timestamp and the third timestamp exceeds an update threshold.

In some embodiments, the first compressed event data item further includes flag information, and the flag information indicates a range of a quantity of bits occupied by the first time information.

Optionally, each compressed event data item in the compressed event data items includes time information and corresponding flag information, and the flag information indicates a quantity of bits occupied by the corresponding time information.

In some embodiments, the event data stream includes a fifth event data item and a sixth event data item. The sixth event data item is an event data item obtained most recently before obtaining the fifth event data item. If a time interval between a fifth timestamp of the fifth event data item and a sixth timestamp of the sixth event data item is greater than background noise duration, the fifth event data item is deleted from the event data stream.

In some embodiments, the process 600 further includes deleting, from the compressed event data stream, a plurality of consecutive compressed event data items that meet the following conditions. A sum of time information of the plurality of consecutive compressed event data items exceeds a hot spot noise duration parameter, a sum of time information of the plurality of consecutive compressed event data items other than a last compressed event data item is less than the hot spot noise duration parameter, and a quantity of the plurality of consecutive compressed event data items exceeds a hot spot noise quantity threshold.

For example, a plurality of consecutive compressed event data items that meet the following conditions may be determined, based on respective time information of the plurality of compressed event data items, from the compressed event data stream. A first accumulated sum of time differences indicated by the time information of the plurality of consecutive compressed event data items exceeds or equals hot spot noise removal duration, and a second accumulated sum of time differences indicated by time information of the plurality of compressed event data items other than a last event data item is less than the hot spot noise removal duration. Further, if a quantity of the plurality of consecutive compressed event data items exceeds a data item quantity threshold, the plurality of consecutive compressed event data items are deleted from the compressed event data stream. Optionally, an initial event data item in the plurality of consecutive compressed event data items is selected from the compressed event data stream based on a predefined sliding window.

Optionally, if time information of a compressed event data item in the plurality of consecutive compressed event data items is a timestamp of an event data item corresponding to the compressed event data item, a time difference indicated by the time information of the compressed event data item is zero.

In some embodiments, after the plurality of consecutive compressed event data items are deleted, the process 600 may further include separately adding the first accumulated sum to time information of at least one compressed event data item in the compressed event data stream that meets the following resetting conditions. The at least one compressed event data item is located after the plurality of consecutive deleted compressed event data items, time information of each of the at least one compressed event data item is a time difference, and time information of a next compressed event data item after the at least one compressed event data item is a timestamp.

In some embodiments, the process 600 may further include deleting a fifth compressed event data item from the compressed event data stream. Fifth time information of the fifth compressed event data item exceeds the background noise duration or is less than refractory period noise duration.

In other words, if the fifth time information of the fifth compressed event data item exceeds the background noise duration or is less than the refractory period noise duration, the fifth compressed event data item is deleted. It may be understood that the fifth time information is the time difference.

In some embodiments, after the fifth compressed event data item is deleted, the process 600 may further include separately adding the fifth time information to time information of at least one compressed event data item in the compressed event data stream that meets the following resetting conditions. The at least one compressed event data item is located after the deleted fifth compressed event data item, time information of each of the at least one compressed event data item is the time difference, and time information of a next compressed event data item after the at least one compressed event data item is the timestamp.

In this way, time information of at least one compressed event data item after the deleted compressed event data item may be updated based on the time information of the deleted compressed event data item.

In some embodiments, the first compressed event data item further includes coordinate information of a pixel, and the coordinate information is determined based on resolution of an event camera that collects the event data stream and target resolution. Specifically, the coordinate information may be determined based on conversion from the resolution of the event camera to the target resolution.

In some embodiments, the first compressed event data item further includes the coordinate information and a polarity of the pixel, and the polarity indicates a luminance change of the pixel when the first event data item is obtained.

In some embodiments, the process 600 may further include performing frame compression processing on a group of compressed event data items in the compressed event data stream within preset duration.

For example, a plurality of compressed event data items within the preset duration may be determined from the compressed event data stream based on time information of each compressed event data item in the compressed event data stream. The plurality of compressed event data items are divided into two groups based on respective polarities of the plurality of compressed event data items, and frame compression processing is performed on the two groups of compressed event data items respectively to obtain two frames of images.

It may be understood that for the process 600 described with reference to FIG. 6 in this embodiment of this disclosure, refer to functions of the modules and the like described with reference to FIG. 1 to FIG. 5. For brevity, details are not repeated herein.

Figure 7:
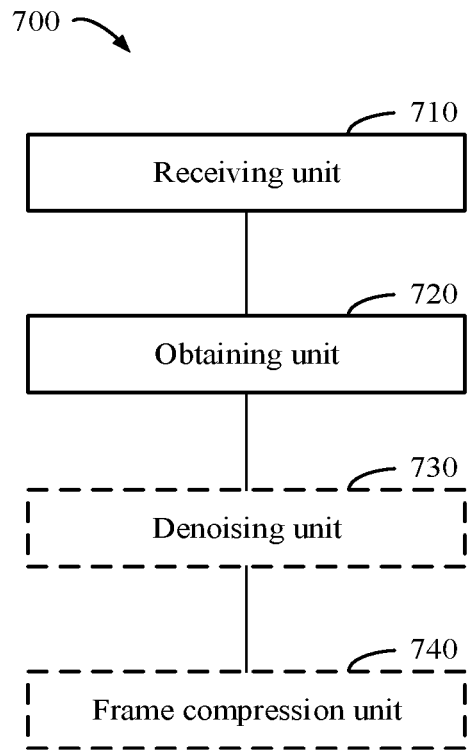
FIG. 7 is a schematic block diagram of a data processing apparatus according to an embodiment of this disclosure.

FIG. 7 is a schematic block diagram of a data processing apparatus 700 according to an embodiment of this disclosure. The apparatus 700 may be implemented by using software, hardware, or a combination thereof. In some embodiments, the apparatus 700 may be a software or hardware apparatus that implements some or all functions of the system 100 shown in FIG. 1.

As shown in FIG. 7, the apparatus 700 includes a receiving unit 710 and an obtaining unit 720. Optionally, the apparatus 700 may further include a denoising unit 730 and a frame compression unit 740.

The receiving unit 710 is configured to receive an event data stream. The event data stream includes at least a first event data item and a second event data item, the first event data item includes a first timestamp for obtaining the first event data item, the second event data item includes a second timestamp for obtaining the second event data item, and the second event data item is an event data item obtained most recently before obtaining the first event data item.

The obtaining unit 720 is configured to obtain a compressed event data stream corresponding to the event data stream. The compressed event data stream includes at least a first compressed event data item corresponding to the first event data item, the first compressed event data item includes first time information, and the first time information is a time difference between the first timestamp and the second timestamp.

In some embodiments, the first compressed event data item further includes flag information, and the flag information indicates a range of a quantity of bits occupied by the first time information.

In some embodiments, the event data stream further includes a third event data item, the compressed event data stream further includes a third compressed event data item corresponding to the third event data item, the third compressed event data item includes third time information, and the third time information is a third timestamp for obtaining the third event data item.

In some embodiments, the compressed event data stream further includes a fourth compressed event data item after the third compressed event data item, fourth time information of the fourth compressed event data item is a fourth timestamp for obtaining a corresponding fourth event data item, and a time difference between the fourth timestamp and the third timestamp exceeds an update threshold.

In some embodiments, the denoising unit 730 is configured to delete a plurality of consecutive compressed event data items from the compressed event data stream that meet the following conditions. A sum of time information of the plurality of consecutive compressed event data items exceeds a hot spot noise duration parameter, a sum of time information of the plurality of consecutive compressed event data items other than a last compressed event data item is less than the hot spot noise duration parameter, and a quantity of the plurality of consecutive compressed event data items exceeds a hot spot noise quantity threshold.

In some embodiments, the denoising unit 730 is configured to delete a fifth compressed event data item from the compressed event data stream. Fifth time information of the fifth compressed event data item exceeds background noise duration or is less than refractory period noise duration.

In some embodiments, the denoising unit 730 is further configured to update, based on time information of a deleted compressed event data item, time information of at least one compressed event data item after the deleted compressed event data item.

In some embodiments, the first compressed event data item further includes coordinate information and a polarity of a pixel, and the polarity indicates a luminance change of the pixel when the first event data item is obtained.

In some embodiments, the first compressed event data item further includes the coordinate information of the pixel, and the coordinate information is determined based on resolution of an event camera that collects the event data stream and target resolution.

In some embodiments, the frame compression unit 740 is configured to perform frame compression processing on a group of compressed event data items in the compressed event data stream within preset duration.

In embodiments of this disclosure, division into the units is an example, is merely logical function division, and may alternatively be another division manner during actual implementation. In addition, functional units in embodiments of this disclosure may be integrated into one processor, or each of the units may exist alone physically, or two or more units may be integrated into one unit. The integrated unit may be implemented in a form of hardware, or may be implemented in a form of a software functional unit.

Figure 8:
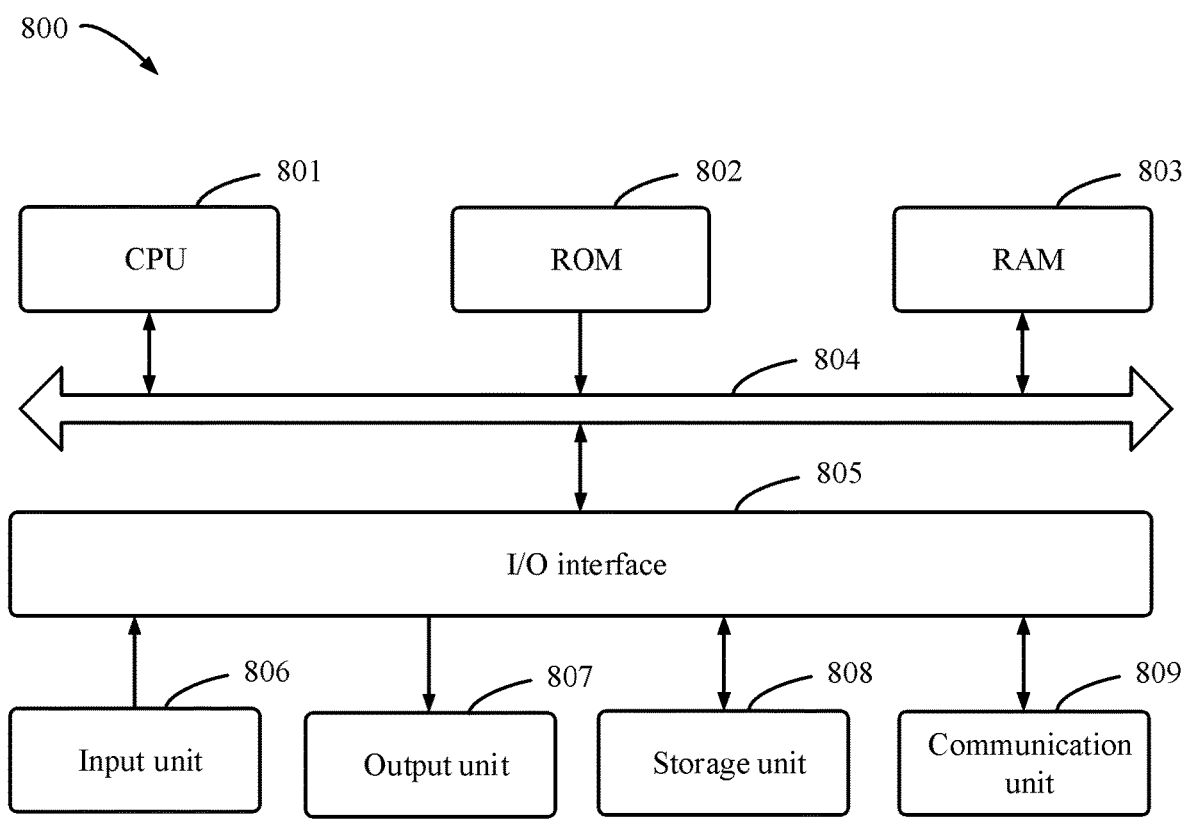
FIG. 8 is a schematic block diagram of an example device that may be configured to implement embodiments of this disclosure.

FIG. 8 is a schematic block diagram of an example device 800 that may be configured to implement embodiments of this disclosure. The device 800 may be implemented or included in a system 100 in FIG. 1.

As shown in the figure, the device 800 includes a central processing unit (CPU) 801, a read-only memory (ROM) 802, and a random-access memory (RAM) 803. The CPU 801 may perform various appropriate actions and processing based on computer program instructions stored in the RAM 802 and/or the RAM 803 or computer program instructions loaded into the ROM 802 and/or the RAM 803 from a storage unit 808. In the ROM 802 and/or the RAM 803, various programs and data required for operations of the 800 may also be stored. The CPU 801 and the ROM 802 and/or the RAM 803 are connected to each other through a bus 804. An input/output (I/O) interface 805 is also connected to the bus 804.

A plurality of components in the device 800 are connected to the I/O interface 805. The plurality of components include an input unit 806, for example, a keyboard or a mouse; an output unit 807, for example, displays or loudspeakers of various types; a storage unit 808, for example, a magnetic disk or an optical disc; and a communication unit 809, for example, a network adapter, a modem, or a wireless communication transceiver. The communication unit 809 allows the device 800 to exchange information/data with another device through a computer network such as the internet and/or various telecommunication networks.

The CPU 801 may be various general-purpose and/or special-purpose processing components having processing and computing capabilities. Some examples that the CPU 801 may be implemented include, but are not limited to, a graphics processing unit (GPU), various dedicated artificial intelligence (AI) computing chips, various computing units that run a machine learning model algorithm, a digital signal processor (DSP), and any suitable processor, controller, microcontroller, and the like. The CPU 801 may be referred to as a computing unit accordingly. The CPU 801 performs various methods and processing described above, for example, a process 600. For example, in some embodiments, the process 600 may be implemented as a computer software program that is tangibly included in a computer-readable medium, for example, the storage unit 808. In some embodiments, some or all of the computer program may be loaded and/or installed on the device 800 by using the ROM 802 and/or the RAM 803 and/or the communication unit 809. When the computer program is loaded into the ROM 802 and/or the RAM 803 and executed by the CPU 801, one or more steps of the process 600 described above may be performed. Alternatively, in other embodiments, the CPU 801 may be configured to execute the process 600 in any suitable manner (for example, by using firmware).

For example, the apparatus 800 in FIG. 8 may be implemented as an electronic device in a distributed system, or may be implemented as a chip or a chip system in an electronic device. This is not limited in this embodiment of this disclosure.

An embodiment of this disclosure further provides a chip. The chip may include an input interface, an output interface, and a processing circuit. In this embodiment of this disclosure, the input interface and the output interface may complete the foregoing signaling or data interaction, and the processing circuit may complete generation and processing of signaling or data information.

An embodiment of this disclosure further provides a chip system. The chip system includes a processor, and the processor is configured to support a system 100 to implement functions involved in any of the foregoing embodiments. In a possible design, the chip system may further include a memory. The memory is configured to store necessary program instructions and data. When the processor runs the program instructions, a device on which the chip system is installed is enabled to perform the method in any one of the foregoing embodiments. The chip system may include a chip, or may include a chip and another discrete component.

An embodiment of this disclosure further provides a processor. The processor is configured to be coupled to a memory. The memory stores instructions. When the processor runs the instructions, the processor is enabled to perform the method and functions related to a system 100 in any one of the foregoing embodiments.

An embodiment of this disclosure further provides a computer program product including instructions. When the computer program product runs on a computer, the computer is enabled to perform the method and the functions related to a system 100 in any one of the foregoing embodiments.

An embodiment of this disclosure further provides a computer-readable storage medium. The computer-readable storage medium stores computer instructions. When a processor runs the instructions, the processor is enabled to perform the method and functions related to a system 100 in any one of the foregoing embodiments.

Generally, various embodiments of this disclosure may be implemented by hardware or a dedicated circuit, software, logic, or any combination thereof. Some aspects may be implemented by hardware, and other aspects may be implemented by firmware or software, and may be performed by a controller, a microprocessor, or another computing device. Although aspects of embodiments of this disclosure are shown and illustrated as block diagrams, flowcharts, or other diagrams, it should be understood that blocks, apparatuses, systems, technologies, or methods described in this specification may be implemented as, for example, non-limiting examples, hardware, software, firmware, dedicated circuits, logic, general-purpose hardware, controllers, other computing devices, or a combination thereof.

This disclosure further provides at least one computer program product tangibly stored on a non-transitory computer-readable storage medium. The computer program product includes computer-executable instructions, such as instructions included in a program module, executed in a device on a real or virtual target processor to perform the process/method as described above with reference to the foregoing drawings. Generally, the program module includes a routine, a program, a library, an object, a class, a component, a data structure, and the like that execute a particular task or implement a particular abstract data type. In various embodiments, functions of program modules may be combined or a function of a program module may be split as needed. Machine-executable instructions for the program module may be executed locally or within a distributed device. In the distributed device, the program modules may be located in local and remote storage media.

Computer program code used to implement the methods disclosed in this disclosure may be written in one or more programming languages. The computer program code may be provided for a processor of a general-purpose computer, a dedicated computer, or another programmable data processing apparatus, so that when the program code is executed by the computer or the another programmable data processing apparatus, functions/operations specified in the flowcharts and/or block diagrams are implemented. The program code may be executed all on a computer, partially on a computer, as an independent software package, partially on a computer and partially on a remote computer, or all on a remote computer or server.

In a context of this disclosure, the computer program code or related data may be carried by any appropriate carrier, so that a device, an apparatus, or a processor can perform various processing and operations described above. Examples of the carrier include a signal, a computer-readable medium, and the like. Examples of the signal may include propagating signals in electrical, optical, radio, sound, or other forms, such as a carrier and an infrared signal.

The computer-readable medium may be any tangible medium that includes or stores a program used for or related to an instruction execution system, apparatus, or device. The computer-readable medium may be a computer-readable signal medium or a computer-readable storage medium. The computer-readable medium may include but is not limited to an electronic, magnetic, optical, electromagnetic, infrared, or semiconductor system, apparatus, or device, or any suitable combination thereof. More detailed examples of the computer-readable storage medium include an electrical connection with one or more wires, a portable computer disk, a hard disk, a RAM, a ROM, an erasable programmable read-only memory (EPROM or flash memory), an optical storage device, a magnetic storage device, or any suitable combination thereof.

In addition, although the operations of the methods disclosed in this disclosure are described in a particular order in the accompanying drawings, this does not require or imply that these operations need to be performed in the particular order or that all of the shown operations need to be performed to achieve a desired result. Instead, execution orders of the steps depicted in the flowcharts may change. Addition or optionally, some steps may be omitted, a plurality of steps may be combined into one step for execution, and/or one step may be decomposed into a plurality of steps for execution. It should further be noted that features and functions of two or more apparatuses according to this disclosure may be specified in one apparatus. On the contrary, features and functions of one apparatus described above may be further divided into a plurality of apparatuses for materialization.

The implementations of this disclosure are described above. The foregoing descriptions are examples, are not exhaustive, and are not limited to the disclosed implementations. Many modifications and variations are apparent to a person of ordinary skill in the art without departing from the scope and spirit of the described implementations. Selection of terms used in this specification is intended to well explain implementation principles, actual application, or improvements to technologies in the market, or to enable another person of ordinary skill in the art to understand the implementations disclosed in this specification.

What is claimed is:

1. A method comprising:
   receiving an event data stream that comprises a first event data item and a second event data item, wherein the first event data item comprises a first timestamp for obtaining the first event data item, wherein the second event data item comprises a second timestamp for obtaining the second event data item, and wherein the second timestamp and the first timestamp indicate that the second event data item is an event data item obtained most recently before obtaining the first event data item; and obtaining a compressed event data stream corresponding to the event data stream, wherein the compressed event data stream comprises a first compressed event data item that corresponds to the first event data item and that comprises first time information and flag information, wherein the first time information is a time difference between the first timestamp and the second timestamp, wherein the flag information indicates a range of a first quantity of bits occupied by the first time information, and wherein a second quantity of bits occupied by the flag information is 2.

2. The method according to claim 1, wherein the event data stream further comprises a third event data item, wherein the compressed event data stream further comprises a second compressed event data item that corresponds to the third event data item and that comprises second time information, and wherein the second time information is a third timestamp for obtaining the third event data item.

3. The method according to claim 2, wherein the compressed event data stream further comprises a third compressed event data item comprising third time information, wherein the third time information and the second time information indicate that the third compressed event data item is obtained after the second compressed event data item, wherein the third time information is a fourth timestamp for obtaining a corresponding fourth event data item, and wherein a time difference between the fourth timestamp and the third timestamp exceeds an update threshold.

4. The method according to claim 1, further comprising deleting, from the compressed event data stream, a plurality of consecutive compressed event data items that meet a plurality of conditions including that a first sum of time information of the consecutive compressed event data items exceeds a hot spot noise duration parameter, a second sum of time information of the consecutive compressed event data items other than a last compressed event data item is less than the hot spot noise duration parameter, and a quantity of the consecutive compressed event data items exceeds a hot spot noise quantity threshold.

5. The method according to claim 1, further comprising deleting a second compressed event data item comprising second time information from the compressed event data stream, wherein the second time information exceeds a background noise duration.

6. The method according to claim 1, further comprising updating, based on second time information of a deleted compressed event data item, third time information of at least one compressed event data item, wherein the third time information and the second time information indicate that the at least one compressed event data item is obtained after the deleted compressed event data item.

7. The method according to claim 1, wherein the first compressed event data item further comprises coordinate information and a polarity of a pixel, wherein the polarity indicates a luminance change of the pixel.

8. The method according to claim 1, wherein the first compressed event data item further comprises coordinate information of a pixel, and wherein the coordination information is based on a resolution of an event camera for collecting the event data stream and target resolution.

9. The method according to claim 1, further comprising performing frame compression processing on a group of compressed event data items in the compressed event data stream within a preset duration.

10. An apparatus, comprising:
a memory configured to store instructions; and
one or more processors coupled to the memory and configured to execute the instructions to cause the apparatus to:
receive an event data stream that comprises a first event data item and a second event data item, wherein the first event data item comprises a first timestamp for obtaining the first event data item, wherein the second event data item comprises a second timestamp for obtaining the second event data item, and wherein the second timestamp and the first timestamp indicate that the second event data item is an event data item obtained most recently before obtaining the first event data item; and
obtain a compressed event data stream corresponding to the event data stream,
wherein the compressed event data stream comprises a first compressed event data item that corresponds to the first event data item and that comprises first time information and flag information,
wherein the first time information is a time difference between the first timestamp and the second timestamp,
wherein the flag information indicates a range of a first quantity of bits occupied by the first time information, and
wherein a second quantity of bits occupied by the flag information is 2.

11. The apparatus according to claim 10, wherein the event data stream further comprises a third event data item, wherein the compressed event data stream further comprises a second compressed event data item that corresponds to the third event data item and that comprises second time information, and wherein the second time information is a third timestamp for obtaining the third event data item.

12. The apparatus according to claim 11, wherein the compressed event data stream further comprises a third compressed event data item comprising third time information, wherein the third time information and the second time information indicate that the third compressed event data item is obtained after the second compressed event data item, wherein the third time information is a fourth timestamp for obtaining a corresponding fourth event data item, and wherein a time difference between the fourth timestamp and the third timestamp exceeds an update threshold.

13. The apparatus according to claim 10, further comprising a denoising unit, configured to delete, from the compressed event data stream, a plurality of consecutive compressed event data items that meet a plurality of conditions including that a first sum of time information of the consecutive compressed event data items exceeds a hot spot noise duration parameter, a second sum of time information of the consecutive compressed event data items other than a last compressed event data item is less than a hot spot noise duration parameter, and a quantity of the consecutive compressed event data items exceeds a hot spot noise quantity threshold.

14. The apparatus according to claim 10, wherein the one or more processors is further configured to execute the instructions to cause the apparatus to delete a second compressed event data item comprising second time information from the compressed event data stream, wherein the second time information exceeds background noise duration.

15. The apparatus according to claim 13, wherein the one or more processors is further configured to execute the instructions to cause the apparatus to update, based on second time information of a deleted compressed event data item, third time information of at least one compressed event data item, and wherein the third time information and the second time information indicate that the at least one compressed event data item is obtained after the deleted compressed event data item.

16. The apparatus according to claim 10, wherein the first compressed event data item further comprises coordinate information and a polarity of a pixel, and wherein the polarity indicates a luminance change of the pixel when the first event data item is obtained.

17. The apparatus according to claim 10, wherein the first compressed event data item further comprises coordinate information of a pixel, and wherein the coordination information is based on resolution of an event camera for collecting the event data stream and target resolution.

18. The apparatus according to claim 10, wherein the one or more processors is further configured to execute the instructions to cause the apparatus to perform frame compression processing on a group of compressed event data items in the compressed event data stream within a preset duration.

19. The apparatus according to claim 10, wherein the one or more processors is further configured to execute the instructions to cause the apparatus to delete a second compressed event data item comprising second time information from the compressed event data stream, wherein the second time information is less than refractory period noise duration.

20. The method according to claim 1, further comprising deleting a second compressed event data item comprising second time information from the compressed event data stream, wherein the second time information is less than a refractory period noise duration.

* * * * *